United States Patent
Chen

(10) Patent No.: US 9,898,795 B2
(45) Date of Patent: Feb. 20, 2018

(54) HOST-BASED HETEROGENEOUS MULTI-GPU ASSIGNMENT

(71) Applicant: VMware, Inc., Palo Alto, CA (US)

(72) Inventor: Si Chen, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 363 days.

(21) Appl. No.: 14/309,304

(22) Filed: Jun. 19, 2014

(65) Prior Publication Data

US 2015/0371355 A1    Dec. 24, 2015

(51) Int. Cl.
*G06T 1/20* (2006.01)
*G06F 9/455* (2006.01)

(52) U.S. Cl.
CPC ............ *G06T 1/20* (2013.01); *G06F 9/45533* (2013.01); *G06F 2009/45579* (2013.01)

(58) Field of Classification Search
CPC .................... G06F 9/45533; G06F 2009/45579
See application file for complete search history.

(56) References Cited

U.S. PATENT DOCUMENTS

| | | | | |
|---|---|---|---|---|
| 8,341,624 B1* | 12/2012 | Hobbs | .................. | H04N 19/152 709/204 |
| 2010/0115510 A1* | 5/2010 | Ford | ..................... | G06F 9/5077 718/1 |
| 2012/0084774 A1* | 4/2012 | Post | ..................... | G06F 9/5088 718/1 |
| 2012/0324441 A1* | 12/2012 | Gulati | .................. | G06F 9/5088 718/1 |
| 2013/0174144 A1 | 7/2013 | Cheng | | |
| 2014/0184622 A1* | 7/2014 | Xia | ........................... | G06T 1/20 345/522 |
| 2014/0215462 A1* | 7/2014 | Kuo | .................... | G06F 9/45533 718/1 |
| 2016/0239333 A1* | 8/2016 | Cowperthwaite | ....... | G06F 9/461 |

OTHER PUBLICATIONS

Gupta et al., "GViM: GPU-accelerated Virtual Machines", 3rd Workshop on System-level Virtualization for High Performance Computing, 2009, 8 pages.
Unknown, "Credit Scheduler", Xen Project, accessed from <<http://wiki.xen.org/wiki?title=Credit_Scheduler>>, 2013, 4 pages.
Unknown, "Network I/O Resource Management in vSphere 4.1 and vSphere 5.x with vDS", Knowledge Base, accessed from <<http://kb.vmware.com/selfservice/microsites/search.do?language=en_US&cmd=displayKC&externalId=1022585>>, VMware, Inc., accessed on Jun. 19, 2014, 2 pages.

* cited by examiner

*Primary Examiner* — Maurice L McDowell, Jr.
*Assistant Examiner* — Donna J Ricks

(57) ABSTRACT

Examples of the disclosure assign a plurality of graphics processing units (GPUs) to a plurality of virtual machines (VMs) or processes. A composite score is generated for each GPU. The composite score represents the normalized processing capabilities of the multiple GPUs. Based on a comparison between the composite scores and allocated quantum corresponding to a proportional amount of GPU resources to which each VM is entitled, each VM is assigned to at least one of the GPUs. Graphics commands from the VMs are scheduled for execution by the assigned GPUs.

20 Claims, 7 Drawing Sheets

HOST-BASED HETEROGENEOUS MULTI-GPU ASSIGNMENT

CROSS-REFERENCE TO RELATED APPLICATION

This application is related to a U.S. Patent Application entitled "Host-Based GPU Resource Scheduling", filed concurrently herewith, which is incorporated by reference herein in its entirety.

BACKGROUND

Some existing systems perform graphics commands received from various processes. Specifically hardware, including graphics processing units (GPUs) manage execution of graphics commands. The graphics commands may vary in complexity between two-dimensional commands, three-dimensional commands, surface mapping commands, shading commands, texture rendering commands, and the like. Depending on the complexity of a graphics command, performance of the graphics command may utilize more or less of the GPU resources available to all the processes. Some of the processes, such as virtual machines (VMs), may be operated by different customers, tenants, or users on the same system. Disparity among the needs of the different users and among the different graphics commands often results in an unfair disparity of use of the GPU. In some instances, monopolization of the GPU resources occurs.

There may be multiple different GPUs, having different characteristics and different processing capabilities from each other, in a single system. Drivers for the GPUs reside in the kernel and generally consider all graphics commands as originating from a single user. In such systems, the GPU may execute the graphics commands in a first-in, first-out manner. The GPU drivers do not consider the size or complexity of each graphics command, or the specific processing capabilities of each GPU. Further, the GPU does not recognize any prioritization among the graphics commands. Allocation of graphics commands among the GPUs without regard to complexity of graphics commands or GPU processing power lead to imbalanced loads and sub-optimal throughput.

SUMMARY

One or more examples described herein fairly allocate use of one or more graphics processing units (GPUs) to a plurality of virtual machines (VMs) or processes. A computing device assigns shares to a user having one or more VMs. The computing device generates a composite score for each GPU. The composite score represents the normalized processing capability of the GPU. The computing device adjusts the assigned shares based on graphics command characteristics associated with the VMs, and allocates quantum among the VMs based on the adjusted, assigned shares. The computing device assigns at least one of the GPUs to each VM based on the allocated quantum for the VM and the GPU composite scores. The allocated quantum and assigned GPU for each of the VMs is transmitted to at least one GPU driver. The computing device schedules graphics commands received from the VMs for performance by its assigned GPU.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
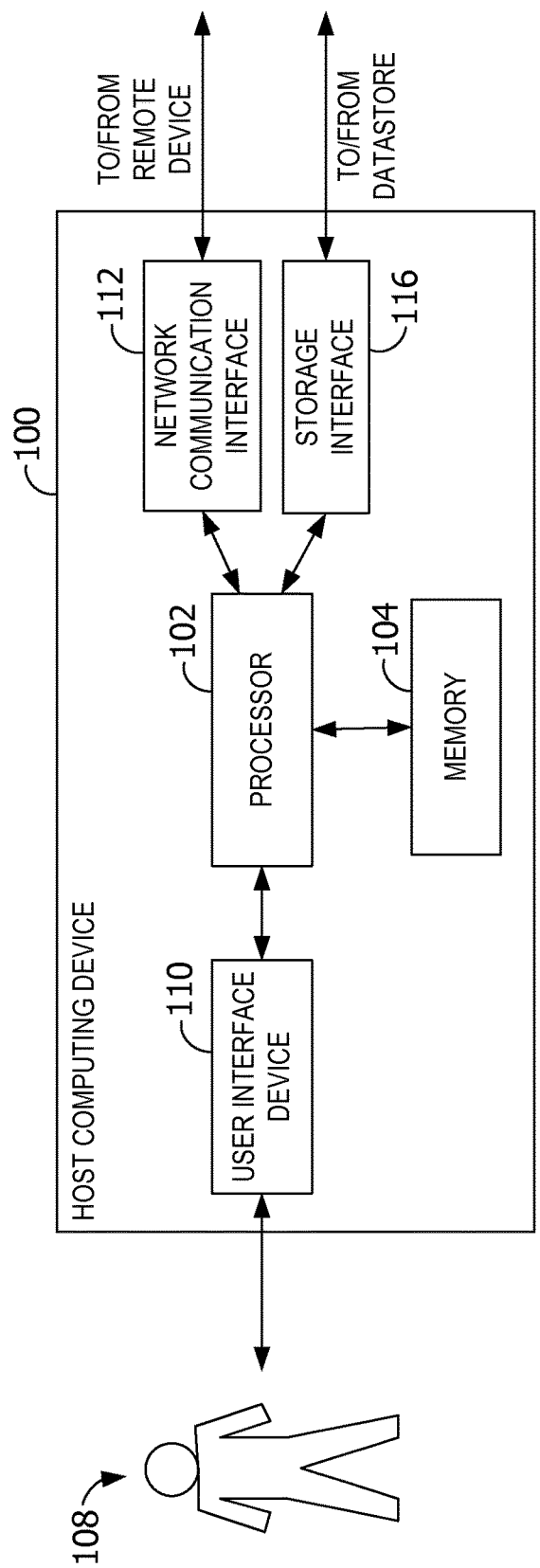
FIG. 1 is a block diagram of an exemplary host computing device.

Examples described herein share a plurality of graphics processing units (GPUs) with a plurality of virtual machines (VMs), and/or processes, executing on a host computing device. In one embodiment, the plurality of GPUs are located on a single host computer. In some examples, at least two of the GPUs are heterogeneous, or otherwise have different processing capabilities as described herein. Aspects of the disclosure generate a composite score for each of the GPUs reflecting the GPU-specific processing capabilities relative to the other GPUs on the host computing device. The GPUs are assigned to the VMs by comparing the composite scores for the GPUs with data describing proportional GPU resource allocations for the VMs. A scheduler, or other module or component, receives graphics commands from the VMs and schedules the received graphics commands for execution by the assigned GPUs. As a result, a pool of VMs share a pool of GPUs.

In another embodiment, the operations described herein are applied to sharing among multiple processes running on a host computing device, instead of a plurality of VMs, in a similar way.

In some examples, during an initialization phase, shares are assigned to the VMs and adjusted based on graphics command characteristics reflecting the type of graphics commands expected to be received from the VMs. The adjusted shares thereby account for the different resource requirements (e.g., complexity) of the different types of graphics commands expected to be issued by each VM, and represent the relative assigned use of the available GPUs. Quantum, or other values, is allocated to the VMs based on the adjusted, assigned shares, and is used for scheduling the graphics commands during runtime. Each VM is assigned to at least one of the GPUs based on the quantum allocated to the VMs and the composite scores for the GPUs, as further described herein. The assignment of GPUs to the VMs may be adjusted based on user preference or other criteria. During a runtime phase, the scheduler enables graphics commands from the VMs to be sent to the assigned GPUs, based on any scheduling mechanism.

While described with reference to an initialization phase and a runtime phase in some examples, the operations described herein may be executed at any time and are not limited to such timing.

Aspects of the disclosure further communicate values corresponding to the allocated quantum and assigned GPU for each VM to at least one GPU driver. The GPU driver is instructed to respect the allocated quantum during execution of the graphics commands on the assigned GPU. For example, the GPU is expected to suspend performance of a graphics command from a VM if execution of the graphics command exceeds an amount of processing corresponding to the quantum allocated to that VM.

Aspects of the disclosure thus share, in a prioritized manner, use of the multiple GPU resources among multiple VMs and/or processes. Further, examples of the disclosure permit a VM-specific and/or process-specific allocation of the multiple GPU resources in a manner that permits fair use of the GPU resources.

Aspects of the disclosure permits optimization of GPU throughput taking into account the complexity of graphical commands and GPU processing capabilities. This also enables mixing and matching of heterogeneous GPUs on the same system while realizing performance improvements. For example, GPUs added to the system do not need to be the same as existing GPUs on the system, thus improving performance of the system, reducing cost, and allowing the system to be more scalable.

Aspects of the disclosure are operable with any module, component, logic, routine, code, and/or process for the prioritized scheduling of the graphics commands from the VMs. An example of such a component includes a kernel mode driver scheduler, or other scheduler. The scheduler, associated with an operating system or a hypervisor, controls the resource allocation of the GPUs. The GPU driver is then instructed to follow the resource allocation from the scheduler. An example of such a scheduler is the VMX scheduler by VMware, Inc.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid-state disks, and/or optical disks. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In an example, storage interface 116 couples host computing device 100 to a storage area network (SAN) (e.g., a Fibre Channel network) and/or to a network-attached storage (NAS) system (e.g., via a packet network). Storage interface 116 may be integrated with network communication interface 112.

Figure 2:
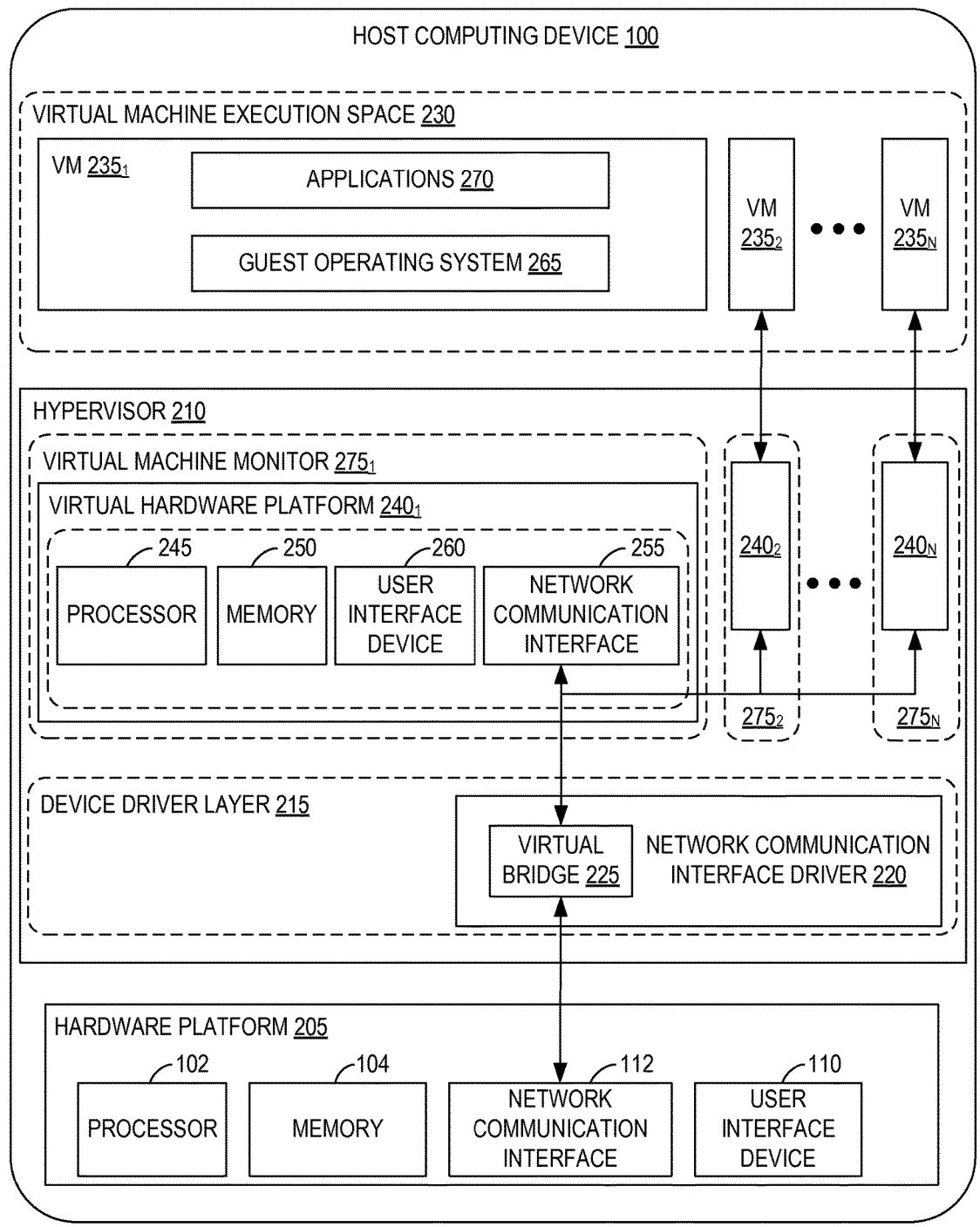
FIG. 2 is a block diagram of virtual machines (VMs) that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM 235 in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM) and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

Figure 3:
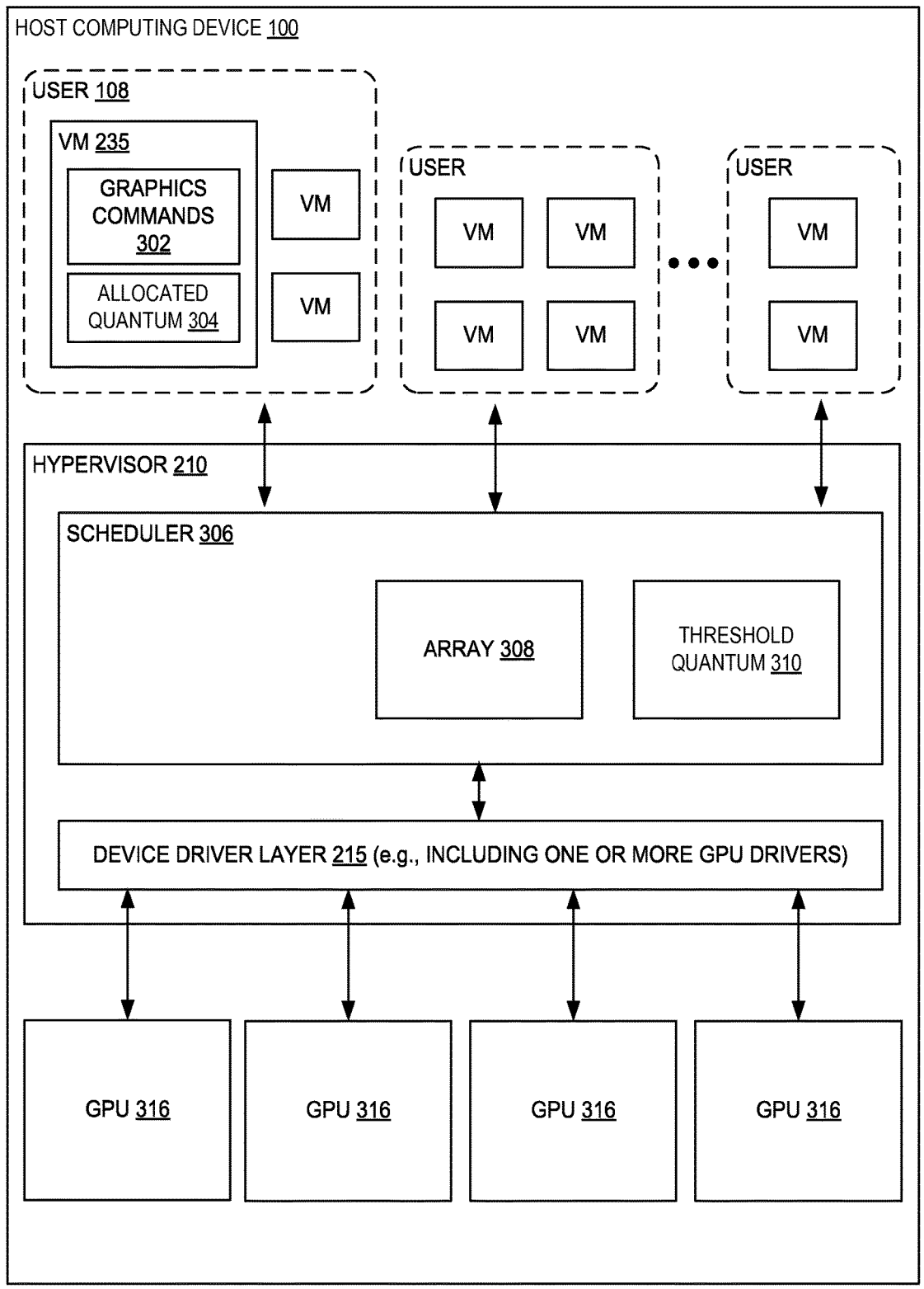
FIG. 3 is a block diagram of one or more computer storage media hosting components that allocating graphics processing unity (GPU) resources among VMs.

FIG. 3 is a block diagram of an exemplary system for assigning a plurality of VMs 235 to GPUs 316. While described with reference to host computing device 100 in FIG. 3, aspects of the disclosure are operable with any computing device or group of computing devices. Host computing device 100 has a plurality of processes, or a plurality of VMs 235, sharing GPUs 316. In some examples, VMs 235 are organized or categorized into groups (e.g., resource groups). VMs 235 may be grouped based on affiliation or ownership, such as with users 108, tenants, customers, or other entities. In the example of FIG. 3, one user 108 has three VMs executing on host computing device 100, another user has four VMs 235 executing on host computing device 100, and still another user 108 has two VMs 235 executing on host computing device 100. VMs 235 may execute simultaneously.

An administrator, such as administrator 402, of host computing device 100 establishes a total number of shares available to all users 108, and assigns a portion of the shares to each user 108. Each share is a value reflecting a proportionate share of GPU 316, reflecting relative entitlement to GPU 316. The shares may be defined in relative units.

The shares may be assigned to users 108 based on a plurality of factors. For example, the shares may be assigned based on how much each user 108 has paid to host computing device 100. Such an example corresponds to environments in which host computing device 100 is part of a cloud service. The shares may also be assigned based on quality of service (QoS) guarantees included in, for example, a service level agreement (SLA) between each user 108 and host computing device 100.

Users 108, and/or scheduler 306, may adjust the assigned shares to reflect the graphics-specific operations anticipated from VMs 235 of each user 108, such as described by graphics command characteristics. The assigned shares may be adjusted for a number of reasons. For example, user 108 or scheduler 306 may adjust the assigned shares based on the nature or complexity of the graphics commands 302 expected from VMs 235, based on internal priorities defined by user 108, and/or other factors. Adjusting the assigned shares includes increasing or decreasing the assigned shares based on these factors.

Graphics command characteristics describe the type of graphics commands 302 expected from VMs 235, and may be defined by users 108, scheduler 306 (e.g., based on graphics commands 302 observed from VMs 235 during runtime), or other entity. For example, each VM 235 may indicate to scheduler 306 (e.g., via an application programming interface) the types of graphics commands 302 VM 235 intends to issue to permit individualized assignment and adjustment of shares by scheduler 306 or other entity.

Exemplary types of graphics commands include, but are not limited to, two-dimensional graphics commands, three dimensional graphics commands, surface mapping commands, shading commands, video commands (e.g., encoding and/or decoding), and/or texture rendering commands. Graphics command characteristics may also indicate VM 235 intends to perform specific graphics commands 302 such as z-buffering, spatial anti-aliasing, alpha blending, mipmapping, atmospheric effects, and/or perspective-correct texture mapping.

Graphics command characteristics may also describe the expected (or observed) runtime behavior of VMs 235. For example, graphics command characteristics may indicate that during runtime, a given VM 235 may only have one discrete graphics command 302 to perform and, after that, VM 235 will have no further need of GPU 316 resources. Alternatively, graphics command characteristics may indicate that VM 235 is issuing graphics commands 302 that rely on heavy user interaction. In such a scenario, the runtime behavior of that VM 235 may require more ongoing, intense use of GPU 316.

Users 108 may subdivide the shares among VMs 235 belonging to each user 108. For example, users 108 may equally divide the assigned shares among its VMs 235. Based on the shares assigned to each VM 235, quantum (e.g., a value) is allocated to each VM 235, and referred to as allocated quantum 304.

VMs 235 generate graphics commands 302. Hypervisor 210 intercepts graphics commands 302 and forwards them to scheduler 306 before graphics commands 302 are performed by one of GPUs 316. While scheduler 306 is described as executing on host computing device 100 in this example, scheduler 306 may execute on any computing device. Further, scheduler 306 refers to any component performing the functionality described herein, and may execute in user space and/or kernel space. In the example of FIG. 3, scheduler 306 is located within hypervisor 210. Scheduler 306 may also refer to hardware configured to perform the functionality described herein.

Scheduler 306 includes an array 308 that is used by scheduler 306 to determine when to send graphics commands 302 received from VMs 235 to GPUs 316. In some examples, array 308 stores, for each VM 235, the accumulated quantum and graphics commands 302 received. Graphics commands 302 may be stored in a first-in-first-out (FIFO) queue. Array 308 is not limited to an array, and any other suitable data structure may also be used. As further described herein, scheduler 306 accumulates quantum for each VM 235 in array 308 and compares the accumulated quantum to a threshold quantum 310 to determine when to send graphics commands 302 to GPU 316. Threshold quantum 310 is tuned to optimize use of GPUs 316, and some examples contemplate a plurality of threshold quantum 310 values (e.g., one threshold quantum 310 value for each GPU 316). If threshold quantum 310 is too small, GPUs 316 may become overloaded. If threshold quantum 310 is too large, GPUs 316 may become under-loaded and remain idle for too long. Adjusting or tuning threshold quantum 310 is described further herein.

Array 308 includes, for example, a process identifier (e.g., VM_ID), allocated quantum 304, and a GPU identifier (e.g., GPU_ID) associated with the assigned GPU 420, for each of the VMs and/or processes executing on host computing device 100.

Scheduler 306 passes graphics commands 302 to GPUs 316 via one or more GPU drivers 307. GPU driver 307 resides in, for example, device driver layer 215 which may be part of hypervisor 210. Alternatively or in addition, GPU driver 307 may be executed by a processor associated with GPU 316. GPU 316 is associated with hardware platform 205, in some examples. In the example of FIG. 3, host computing device 100 has four GPUs 316. However, aspects of the disclosure are operable with any quantity of GPUs 316 on host computing device 100.

Figure 4:
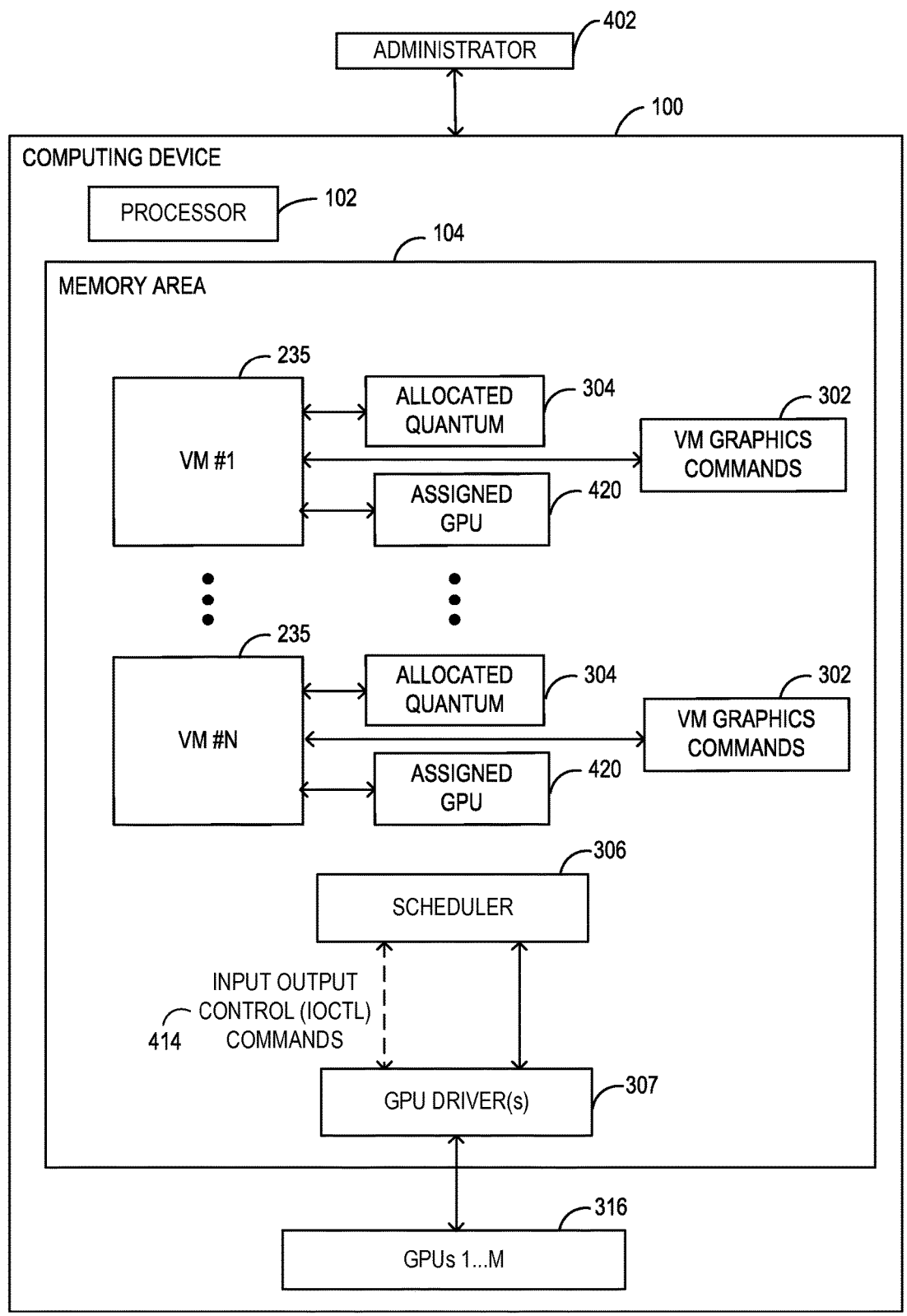
FIG. 4 is a block diagram of an exemplary computing device storing data for assigning VMs to GPUs.

FIG. 4 is a block diagram 400 of an exemplary host computing device 100 for assigning VMS 235 to GPUs 316. Administrator 402 interacts with host computing device 100. Host computing device 100 represents any device executing instructions (e.g., as application programs, operating system functionality, or both) to implement the operations and functionality described herein. Host computing device 100 may include any computing device or processing unit. For example, host computing device 100 may represent a group of processing units or other computing devices, such as in a cloud computing configuration.

Host computing device 100 has at least one processor 102 and memory area 104. Processor 102 includes any quantity of processing units, and is programmed to execute computer-executable instructions for implementing aspects of the disclosure. The instructions may be performed by processor 102 or by multiple processors executing within host computing device 100, or performed by a processor external to host computing device 100. In some examples, processor 102 is programmed to execute instructions such as those illustrated in the figures to implement the assignment of VMs 235, such as VM #1 through VM #N, to GPUs 316, such as GPU #1 through GPU #M. Processor 102 is also programmed to execute instructions such as those illustrated in the figures to schedule graphics commands 302 for execution by GPUs 316.

Memory area 104 includes any quantity of computer-readable media associated with or accessible by host computing device 100. Memory area 104, or portions thereof, may be internal to host computing device 100, external to host computing device 100, or both.

In the example of FIG. 4, memory area 104 stores values corresponding to allocated quantum 304 for each of one or more VMs 235 (or processes) and graphics commands 302 received from the processes during runtime. Memory area 104 further stores a value for each of VMs 235 corresponding to the assigned GPU 420 for that VM 235. This value includes, for example, a GPU identifier such as GPU Host computing device 100 further includes a plurality of GPUs 316, although aspects of the disclosure are operable with only one GPU 316. GPUs 316 may be different from each other in hardware, software, firmware, or other ways. For example, GPUs 316 may each have a different number of cores, processing units, execution units, memory, or the like, and may operate at different frequencies. Further, while GPUs 316 may be physically located on host computing device 100, one or more of GPUs 316 may be located on another computing device, yet accessible to host computing device 100.

Scheduler 306 communicates with GPUs 316 via, for example, one or more of GPU drivers 307. There may be a GPU driver 307 for each of the GPUs 316. Aspects of the disclosure also contemplate a communication channel through which scheduler 306 communicates with GPUs 316. For example, scheduler 306 transmits values corresponding to allocated quantum 304 for each VM 235, as well as threshold quantum 310. For example, scheduler 306 may send an input/output control (IOCTL) command 414 over the communication channel to GPU driver 307. IOCTL command 414 represents any means for communication between host computing device 100 and GPUs 316, and may occur via any component therebetween. Aspects of the disclosure are operable with any IOCTL type or configuration.

Figure 5:
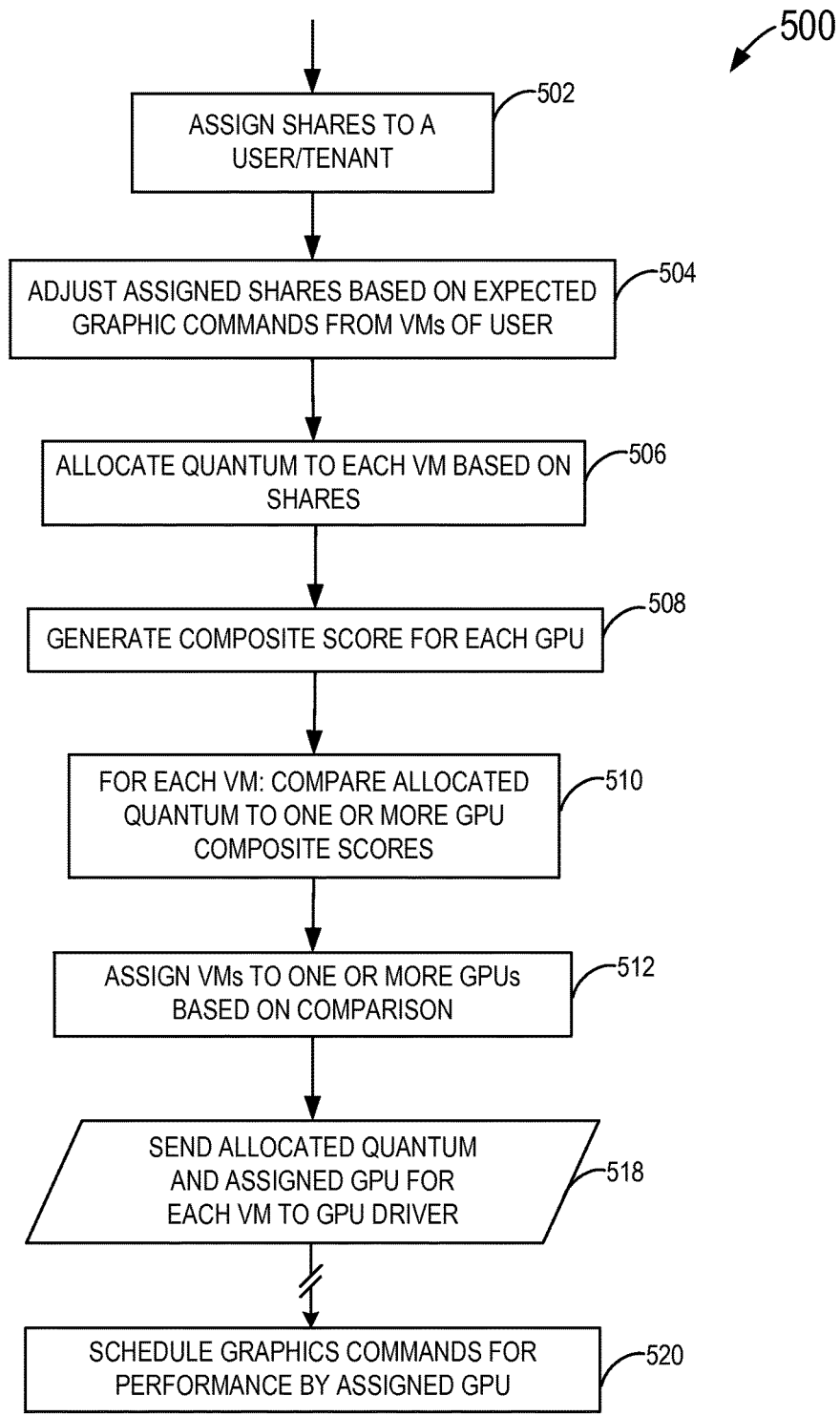
FIG. 5 is a flowchart of an exemplary method performed by the scheduler at initialization to allocate quantum among VMs and to assign VMs to GPUs.

FIG. 5 is a flowchart of an exemplary method 500 performed by host computing device 100 (e.g., at initialization) to allocate quantum among VMs 235 and to assign VMs 235 to GPUs 316. While method 500 is described with reference to execution by host computing device 100, it is contemplated that method 500 may be performed by any component of any computing device.

At 502, host computing device 100 (e.g., scheduler 306) assigns shares to each user 108, tenant, customer, or other entity executing VMs 235 or processes on host computing device 100. In some examples, host computing device 100 assigns the shares based on input received from administrator 402. As described herein, the quantity of assigned shares per user 108 may be determined by a value of payment amounts from each user 108, a privilege level of user 108, a type of VM or process associated with user 108, or any other criteria. For example, users 108 may negotiate SLAs to define the portion of GPU 316 assigned to each user 108. One method of assigning shares may be through an automated algorithm. In some examples, host computing device 100 applies a weighted combination as shown in Equation (1) below to determine a quantity of shares per user 108.

$$\text{shares} = \text{payment} * \log(\text{user interaction}) \quad (1)$$

In this example, both the payment provided by the user and the amount of interaction from user 108 (e.g., continuing input) affects the quantity of shares assigned to user 108.

At 504, host computing device 100 (e.g., scheduler 306) adjusts the shares assigned to one or more of users 108 based on expected graphics commands 302 from VMs 235. The expected graphics commands 302 may be described by graphics command characteristics, or other characteristics, associated with the VMs or processes of users 108. For example, because more sophisticated graphics commands 302, such as three-dimensional commands versus two-dimensional commands, generally require more GPU 316 resources, the assigned shares for users 108 with VMs 235 expected to generate such graphics commands 302 may be increased. This amount may be adjusted formulaically or programmatically. Conversely, the assigned shares for users 108 with VMs 235 expected to generate graphics commands 302 that are less resource-intensive may be decreased. In this manner, the initial assignment of shares is customized based on the anticipated graphics commands 302, thereby creating a customized share assignment for each of users 108.

In an example involving Users A, B, C, and D where the total quantity of shares is 1400, host computing device 100 may assign User A 200 shares, User B 300 shares, User C 500 shares, and User D 400 shares. In this example, the User A shares represent 14.3% of the total shares, the User B shares represent 21.4% of the total shares, the User C shares represent 35.7% of the total shares, and the User D shares represent 28.6% of the total shares, as shown in Table 1 below.

TABLE 1

Example Division of Shares Among Users/Tenants.

| USER | SHARE | % SHARE |
|---|---|---|
| User A | 200 | 14.3% |
| User B | 300 | 21.4% |
| User C | 500 | 35.7% |
| User D | 400 | 28.6% |
| TOTAL | 1400 | 100% |

At 506, host computing device 100 (e.g., scheduler 306) allocates quantum to each process (e.g., VM 235) based on the adjusted, assigned shares. Host computing device 100 allocates the quantum based on, for example, input received from each of users 108. In some examples, users 108 use a tool such as VMTools by VMware, Inc. to provide the input to host computing device 100.

The allocated quantum 304 reflects a subdivision of the assigned shares. For example, each user 108 may subdivide the shares equally among the VMs 235, or unequally among the VMs 235. The allocated quantum for each VM 235 of one of users 108 represents the relative portion of the subdivision of the shares assigned to that user 108. The quantum may be allocated based on various criteria, including the graphics commands characteristics. This enables user 108 to consider the complexity of graphics commands 302 of each VM 235, as well as the expected experience from the perspective of each VM 235. For example, even though a particular VM 235 may be expected to issue low-complexity graphics commands 302, user 108 may want that VM 235 to have a fast user experience and hence allocate more quantum to that VM 235 than other of its VMs 235, thus permitting the less complex commands to be performed quickly. Alternatively or in addition, users 108 allocate quantum among VMs 235 based on an internal prioritization of tasks associated with each of VMs 235. In this scenario, user 108 may assign more quantum to VMs 235 running resource-intensive graphics commands 302 than to VMs 235 expected to generate few graphics commands 302. Further, user 108 may choose to not allocate any quantum to one of its VMs 235 (e.g., to a VM 235 not expected to generate any graphics commands 302).

Continuing the above example involving Users A, B, C, and D, User D may have two VMs 235. User D may then allocate quantum equally between its two VMs 235 by allocating a value of 200 to each of its VMs 235. While the shares are divided equally among VMs 235 in this example, aspects of the disclosure are operable with unequal allocated quantum 304. Each of VMs 235 of User D then has an allocated quantum 304 value of 200.

At 508, host computing device 100 (e.g., scheduler 306) generates a composite score for each GPU 316. For each GPU 316, the composite score corresponds to the processing capability of that GPU 316, and may be defined as a value relative to the other GPUs 316 available to host computing device 316. Calculation of the composite score is described further with reference to FIG. 6 below.

At 510, host computing device 100 (e.g., scheduler 306) compares allocated quantum 304 for each VM 235 to the composite scores for GPUs 316. Based on this comparison, host computing device 100 assigns each of VMs 235 to at least one of GPUs 316 at 512. For example, if the composite score of one GPU 316 is greater than allocated quantum 304 for one VM 235, then that GPU 316 is assigned to that VM 235 (e.g., graphics commands 302 from that VM 235 will be executed by that GPU 316). In another example, if the composite score of one GPU 316 is less than allocated quantum 304 for one VM 235, then VM 235 is assigned to another GPU 316 with a higher composite score, or to multiple GPUs 316 such a sum of the composite scores of the multiple GPUs 316 is greater that allocated quantum 304 for that VM 235.

However, assignment of VMs 235 to GPUs 316 may occur based on any algorithm or preference. For example, the assignment may occur via a greedy algorithm. In such an example, the greedy algorithm makes the best assignment for each VM 235 encountered (e.g., for each VM 235 being assigned, find the available GPU 316 with the highest composite score).

In another example, each VM 235 may be assigned its own dedicated GPU 316. The assignment or correspondence between VMs 235 and GPUs 316 may be adjusted based on preference (e.g., by administrator 402).

At 518, host computing device 100 (e.g., scheduler 306) transmits the values corresponding to allocated quantum 304 and assigned GPU 420 to GPU driver 307, which operates GPU 316. For example, host computing device 100 sends these values as parameters in one or more IOCTL commands 414. GPU 316 and GPU driver 307 are expected to respect and enforce these values when executing graphics commands 302. For example, upon receipt of graphics commands 302 from a particular VM 235, GPU driver 307 has the assigned GPU 420 for that particular VM 235 execute the received graphics commands 302.

Subsequently, during runtime at 520, host computing device 100 schedules graphics commands 302 from VMs 235 for performance by the assigned GPU 420 for each VM 235. Aspects of the disclosure are operable with any scheduling means and/or logic for receiving graphics commands 302 and forwarding, at an appropriate time, graphics commands 302 to the assigned GPUs 420 (or to one or more of GPU drivers 307). GPU driver 307 has the assigned GPU 420 then execute the graphics commands 302.

In some examples, scheduler 306 maintains, in array 308 for each VM 235, values for a VM identifier, accumulated quantum, and assigned GPU 420. The accumulated quantum reflects an amount of quantum accumulated for a VM 235 during each schedule round (or other execution unit) of scheduler 306. When enough quantum has been accumulated (e.g., in comparison to threshold quantum 310) for one or more of VMs 235, scheduler 306 forwards the graphics commands 302 from VM 235 to the assigned GPU 420 for execution. Threshold quantum 310 may start as a default value, or other defined value, that is adjusted dynamically during runtime to optimize loading of GPU 316. Further, there may be one threshold quantum 310 for graphics commands 302, one threshold quantum 310 for each group of graphics commands 302 (e.g., each group corresponding to a different VM 235), and/or one threshold quantum 310 for each graphics command 302. By having different threshold quantums 310 for different graphics commands 302, the threshold quantums 310 may be adjusted such that graphics commands 302 that take more resources are made to wait longer for those resources.

At runtime, scheduler 306 may send graphics commands 302 from more than one VM 235 during the same execution round. In this scenario, GPU driver 307 may process the graphics commands 302 from the VMs 235 in a configured order (e.g., process graphics commands 302 from the VM 235 with the highest associated accumulated quantum). The order may be configured as a preference by scheduler 306 via one of IOCTL commands 414 during initialization, for example.

In an example, upon receipt of graphics commands 302 from scheduler 306, GPU driver 307 executes graphics commands 302 using the assigned GPU 420 while respecting allocated quantum 304 for each VM 235. For example, GPU 316 may convert each allocated quantum 304 into a time slice, priority, quantity of GPU 316 cores, or other unit or metric of execution of GPU 316. If execution by GPU 316 of the received graphics commands 302 from a particular VM 235 has not completed within the time slice corresponding to allocated quantum 304 for that VM 235, GPU 316 suspends execution of graphics commands 302 from that VM 235 and proceeds to execute graphics commands from other VMs 235. In this manner, GPU 316 respects the relative priorities of VMs 235, and prevents starvation of any one GPU resource group.

Some examples contemplate host computing device 100 periodically or intermittently monitoring utilization of one or more of GPUs 316 to identify unused processing capability of GPUs 316, or overload conditions. For example, scheduler 306 may poll the GPUs 316 and GPU driver 307 to determine a real-time load on GPUs 316. Host computing device 100 may dynamically re-assign GPUs 316 to VMs 235 based on the monitored GPU 316 utilization to load balance GPUs 316.

Scheduler 306 may also poll GPUs 316 to determine their temperature, memory error count, and/or for any other information which may affect GPU 316 performance. Depending on how efficiently each GPU 316 is processing graphics commands 302, scheduler 306 may reduce or increase threshold quantum 310 for that GPU 316 to change the load on that GPU 316, and/or may re-assign one or more GPUs 316 to other VMs 235.

Figure 6:
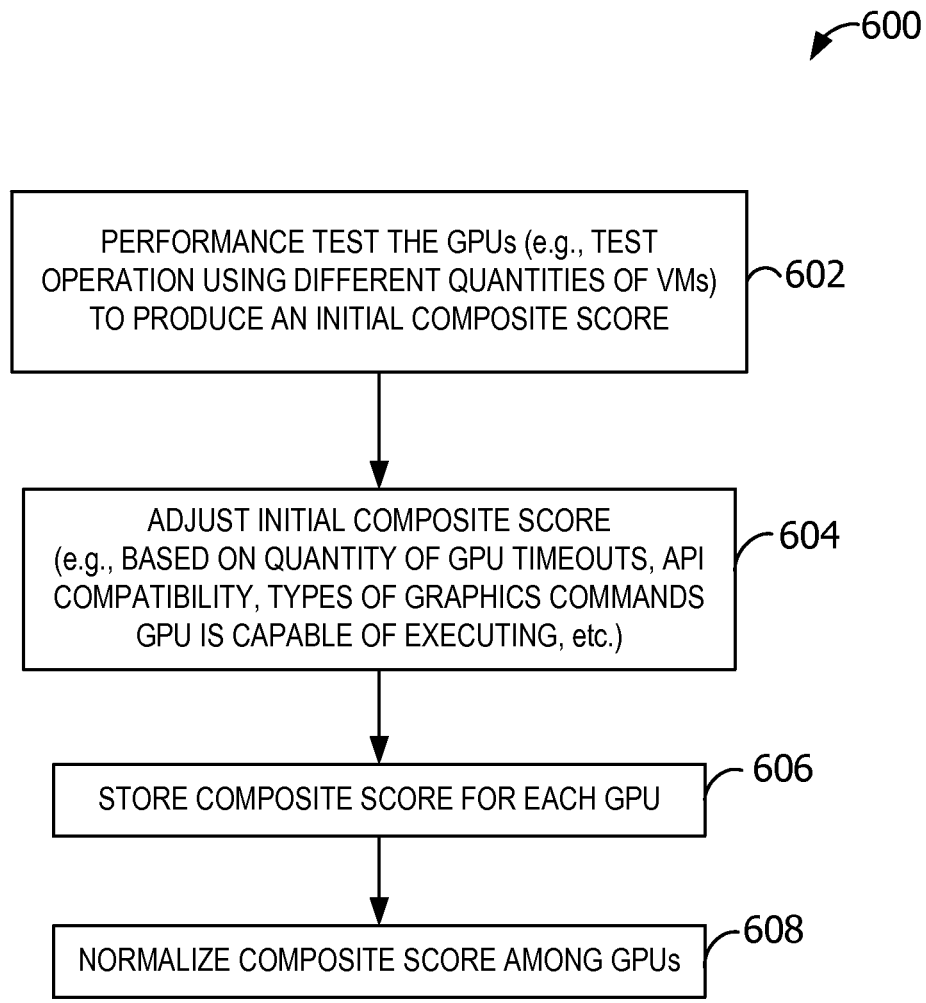
FIG. 6 is a flowchart of an exemplary method that assigns and adjusts composite scores for GPUs.

FIG. 6 is a flowchart of an exemplary method 600 that generates composite scores for GPUs 316 based on benchmark scores, performance testing, processing capability, number of timeouts, and/or other factors. While method 600 is described with reference to execution by host computing device 100 (e.g., during initialization, upon addition of another GPU 316 into host computing device 100, and/or removal of at least one GPU 316 from host computing device 100), it is contemplated that method 600 may be performed by any component of any computing device. For example, a dedicated test bed machine may generate the composite scores for use by host computing device 100 when assigning GPUs 316 to VMs 235.

At 602, host computing device 100 generates an initial composite score for each of GPUs 316. For example, the initial composite score is generated while graphics commands 302 from various quantities of VMs 235 are being executed. In contrast to some existing systems in which a GPU is given a benchmark score based on its execution of graphics commands from a single process (or execution of a single complex graphics command), aspects of the disclosure contemplate generating an initial benchmark composite score based on performance by each GPU 316 of graphics commands 302 from differing quantities of VMs 235. For example, for each GPU 316, scores may be generated in view of execution of graphics commands 302 by GPU 316 received from 1 VM, 2 VMs, 5 VMs, 100 VMs, 500 VMs, and/or 1000 VMs executing on host computing device 100. The generated scores from these varying quantities of VMs 235 may be combined in a weighted manner to generate the composite score for the GPU 316. For example, the composite score may be created by weighting scores from execution of larger quantities of VMs higher than scores from execution of lower quantities of VMs, for that GPU 316. In this manner, the benchmark scores resulting from execution of each different quantity of VMs 235 may be combined to create the initial composite score for each GPU 316.

At 604, host computing device 100 adjusts the initial composite score for each GPU 316. For example, the composite score for one or more of GPUs 316 may be reduced if that GPU 316 experienced a high quantity of timeouts (e.g., above a pre-defined threshold). Timeouts occur when GPU 316 is not able to complete graphical commands 302 within a given time period. For example, for a given set of graphics commands 302, host computing device 100 counts the quantity of timeouts occurring on GPU 316 during the test execution at 602. If there are many timeouts, then the initial composite score for that GPU 316 may be lowered. Conversely, the initial composite score for one or more of GPUs 316 may be increased if that GPU 316 experienced a low quantity of timeouts (e.g., below the pre-defined threshold).

Alternatively or in addition, the initial composite score may be adjusted based on application programming interface (API) compatibility. For example, the initial composite scores for GPUs 316 supporting particular APIs may be increased. Conversely, the initial composite scores for GPUs 316 may be reduced for GPUs 316 that lack compatibility with particular APIs. Exemplary APIs include, but are not limited to, OpenGL 3.2, OpenGL 4.x, DirectX 9, DirectX 11, and the like.

Alternatively or in addition, the initial composite score may be adjusted based on the types of graphics commands 302 supported by each GPU 316. For example, the initial composite score for a first GPU 316 may be increased relative to a second GPU 316 if the first GPU 316 supports three-dimensional rendering operations and the second GPU 316 does not.

Other adjustments to the initial composite scores are contemplated. For example, the initial composite score for one of GPUs 316 that consumes less power than the other GPUs 316 (or power less than a threshold value), when executing the same test set of graphics commands 302, is increased.

After the adjustments at 604, the composite score for each GPU 316 is stored (e.g., in memory area 104) at 606.

At 608, the composite scores for the GPUs are normalized relative to each other. Normalizing includes adjusting the composite scores relative to a total processing capability or power available to host computing device 100 (e.g., from all GPUs 316 available to host computing device 100). Aspects of the disclosure are operable with any means and/or logic for normalizing the composite scores relative to each other.

In some examples, normalizing includes defining a GPU basic computing unit (GBCU) representing a computing power share of each GPU 316 that equals the computing power share of each other GPU 316. Host computing device 100 then assigns GPUs 316 to VMs 235 based on a comparison between allocated quantum 304 and the composite scores (e.g., normalized).

An example of normalizing the composite scores and assigning GPUs 316 to VMs 235 is next described. In this example, host computing device 100 has three GPUs 316: GPU1, GPU2, and GPU3. Exemplary GPUs and processing capabilities include NV Strong GPU (960 thread processors, 1500 megahertz processor, 16 gigabytes memory), AMD GPU (320 unified shader cores, 16 texture mapping units, 16 render output units, 688 megahertz processor, 2 gigabytes memory), and Intel Integrated GPU (16 execution units, 650 megahertz, 512 megabytes memory).

Each of GPU1, GPU2, and GPU3 is benchmarked to produce an initial composite score. For example, using systems such as a 3DMark06 tool and/or a CINEBENCH brand tool analyzing performance of varied quantities of VMs 235 as described with reference to FIG. 6, initial composite scores of 900, 500, and 100 for GPU1, GPU2, and GPU3 are generated. Other methods for scoring GPUs 316 are contemplated, however. Based on various factors such as described with reference to FIG. 6 (e.g., API compatibility), the initial composite scores are adjusted to the values shown in Table 2 below.

TABLE 2

Example Adjusted, Initial Composite Scores.

|  | Adjusted Initial Composite Score |
|---|---|
| GPU1 | 1000 |
| GPU2 | 400 |
| GPU3 | 150 |
| Total | 1550 |

The GBCU is defined to equate the computing power of each GPU as shown in Equation (2) below, in some aspects of the disclosure.

$$\frac{1}{1000} \text{ of } GPU1 \approx \frac{1}{400} \text{ of } GPU2 \approx \frac{1}{150} \text{ of } GPU3 \tag{2}$$

Equation (2) sets $\frac{1}{1000}^{th}$ of the computing power of GPU1 to be equivalent to $\frac{1}{400}^{th}$ of the computing power of GPU2, which is equivalent to $\frac{1}{150}^{th}$ of the computing power of GPU3. In this manner, GPU1 has a 1000 GBCU available, GPU2 has 400 GBCU available, and GPU3 has 150 GBCU available.

The quantity of GBCU given to each VM 235 is next calculated based on allocated quantum 304 for each VM 235. Continuing the above example, User A has 200 assigned shares, User B has 300 assigned shares, User C has 500 assigned shares, and User D has 400 assigned shares. Each of Users A, B, C, and D may subdivide the assigned shares among their VMs 235. An exemplary subdivision is shown in Table 3 below under the "Allocated Quantum" column.

TABLE 3

Example Distribution of GBCU Among VMs.

| | ASSIGNED SHARES | VMs | ALLOCATED QUANTUM | GBCU FOR EACH USER | GBCU FOR EACH VM |
|---|---|---|---|---|---|
| User A | 200 | VM1 | 135.7 | 221 GBCU | 150 GBCU |
| | | VM2 | 45.2 | | 50 GBCU |
| | | VM3 | 19.1 | | 21 GBCU |
| User B | 300 | VM4 | 90.4 | 332 GBCU | 100 GBCU |
| | | VM5 | 90.4 | | 100 GBCU |
| | | VM6 | 119.2 | | 132 GBCU |
| User C | 500 | VM7 | 135.6 | 553 GBCU | 150 GBCU |
| | | VM8 | 364.4 | | 403 GBCU |
| User D | 400 | VM9 | 362.0 | 442 GBCU | 400 GBCU |
| | | VM10 | 38.0 | | 42 GBCU |
| TOTAL | 1400 | | 1400 | 1550 | 1550 |

In this example as shown in Table 3 above, User A is given 14.3% of the total available GPU computing power (e.g., 200/1400), which corresponds to 221 GBCU (e.g., 14.3% of 1550). User B is given 21.4% of the total available GPU computing power (e.g., 300/1400), which corresponds to 332 GBCU (e.g., 21.4% of 1550). User C is given 35.7% of the total available GPU computing power (e.g., 500/1400), which corresponds to 553 GBCU (e.g., 35.7% of 1550). User D is given 28.6% of the total available GPU computing power (e.g., 400/1400), which corresponds to 442 GBCU (e.g., 28.6% of 1550). In column "GBCU For Each VM" of Table 3 above, GBCU is allocated among each VM 235 of each of Users A, B, C, and D in a similar proportional manner.

Next, an assignment between VMs 1-10 and GPUs 1-3 is performed based on the data in Table 3 above. The assignment may occur via any algorithm, logic, and/or means such that the total GBCU from VMs assigned to each GPU is less or equal to the total GBCU available on that GPU. Table 4 below shows an example assignment between VMs 1-10 and GPUs 1-3, although other assignments are available.

TABLE 4

Example Assignment Between GPUs and VMs.

| VMs | GBCU FOR EACH VM | ASSIGNED GPU |
|---|---|---|
| VM1 | 150 GBCU | GPU1 |
| VM2 | 50 GBCU | GPU1 |
| VM3 | 21 GBCU | GPU1 |
| VM4 | 100 GBCU | GPU1 |
| VM5 | 100 GBCU | GPU1 |
| VM6 | 132 GBCU | GPU1 |
| VM7 | 150 GBCU | GPU3 |
| VM8 | 403 GBCU | GPU1 |
| VM9 | 400 GBCU | GPU2 |
| VM10 | 42 GBCU | GPU1 |

Figure 7:
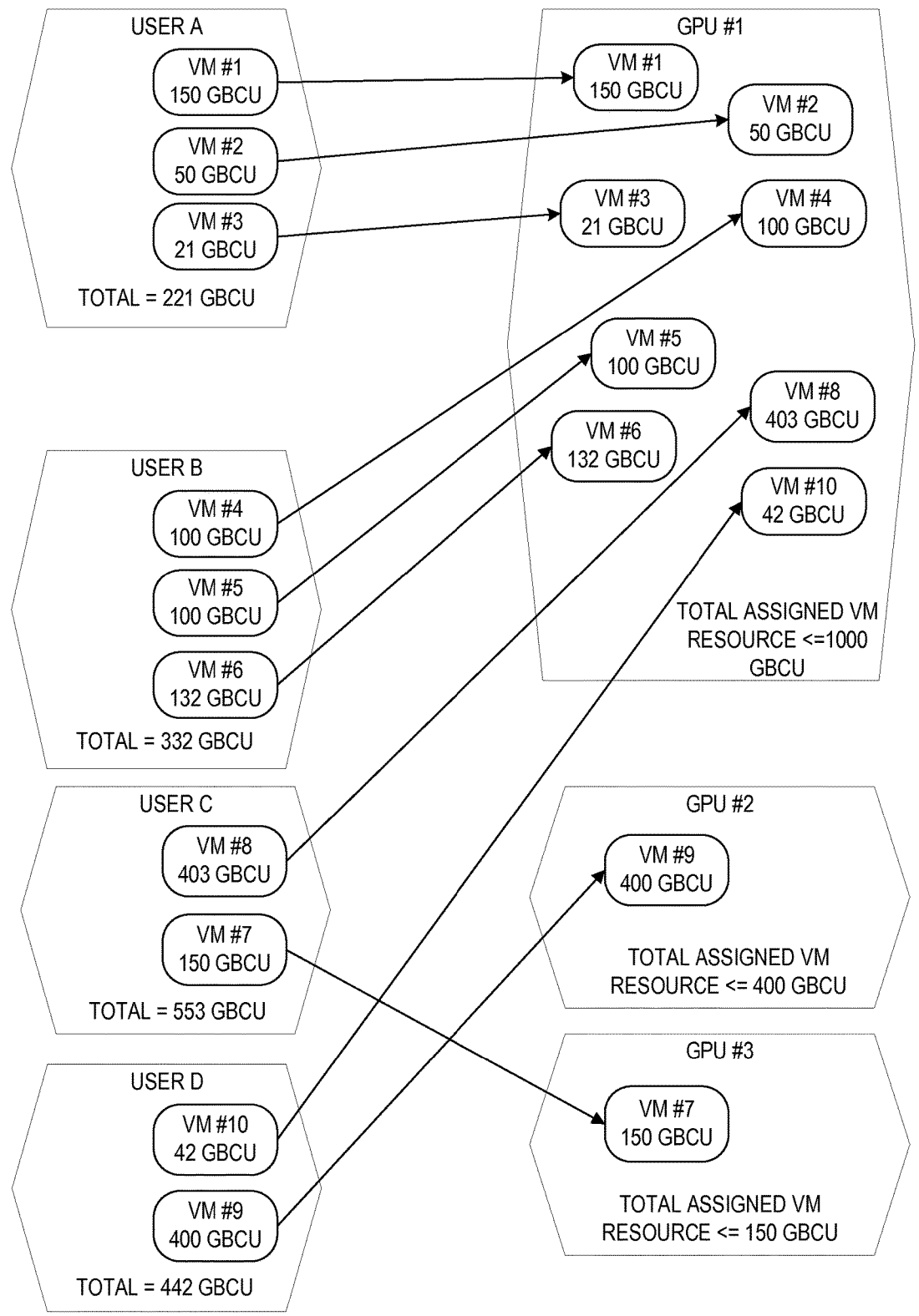
FIG. 7 is a block diagram of an example of an assignment between VMs and GPUs.

The assignment shown in Table 4 above is illustrated in FIG. 7.

FIG. 7 is a block diagram of an exemplary assignment of GPUs 316 and VMs 235. Continuing the above example, there are three GPUs: GPU1, GPU2 and GPU3. GPU1 has a normalized composite score of 1000 GBCU, GPU2 has a normalized composite score of 400 GBCU, and GPU3 has a normalized composite score of 150 GBCU. The total GPU resource available is 1550 GBCU. Allocation of VMs 235 to GPUs 316 may be based on a greedy algorithm, an even distribution of VMs 235 to GPUs 316, an allocation of the most powerful GPU 316 to the user 108 having the most assigned shares, or any other assignment.

In the example of FIG. 7, the VMs are assigned to the GPUs such that each GPU is near maximum capacity (e.g., the sum of the allocated quantum for the VMs assigned to a GPU equals the composite score for that GPU). In particular, GPU2 with a composite score of 400 GBCU is assigned VM9 which has an allocated quantum of 400 GBCU, and GPU3 with a composite score of 150 GBCU is assigned VM7 which has an allocated quantum of 150 GBCU. All other VMs are assigned to GPU1 which has a composite score of 1000 GBCU. The list of VMs 235 with their allocated quantum 304 and assigned GPU 420 is sent to GPU driver 307.

Additional Examples

The following scenarios are merely exemplary and not intended to be limiting in any way.

In one scenario, the allocation of quantum to VMs 235 and assignment between VMs 235 and GPUs 316 may be performed at initialization (e.g., when a VM 235 is powered on, when host computing device 100 is powered on, after a VM 235 is powered down, when a GPU 316 is added, when a GPU 316 is removed, etc.). Generation of the composite scores for each GPU 316 may also occur (or re-occur) dynamically at any of these example initialization events.

The assignment between VM 235 and GPU 316 may change during runtime. If the GPU 316 for one of VMs 235 is changed from one scheduler 306 cycle to another, surface data and other graphics command information may have to be copied to memory of the new GPU 316. Aspects of the disclosure may assign VMs 235 to the same GPU 316 if those VMs 235 share the same surface data or other graphics command information. Knowledge of such sharing may be captured in the graphics commands characteristics, and/or observed by host computing device 100 during runtime (e.g., by examining the issued graphics commands 302).

In another example, host computing device 100 may assign all VMs 235 of one user 108 or other resource group to a single GPU 316, if the GPU 316 can accommodate all the needs of those VMs 235.

In another example, host computing device 100 may assign the VMs 235 having the largest allocated quantum 304 to the GPUs 316 having the largest processing power.

Aspects of the disclosure achieve performance improvements (e.g., increased GPU throughput) even on systems with heterogeneous hardware configurations on host computing device 100. For example, performance improvements are realized on a system having one integrated GPU with relatively has lower processing power, and additional GPUs with higher processing power that are later added to the system. In such a case, the integrated GPU has a lower composite score and the added GPUs have higher composite scores.

In some embodiments, hypervisor 210 shares GPUs 316 among multiple VMs 235 using scheduler 306. In other embodiments, a computer may similarly share GPUs among multiple processes running on the computer using a resource scheduler.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device, such as host computing device 100, when programmed to execute the instructions described herein.

The examples illustrated and described herein as well as examples not specifically described herein but within the scope of aspects of the invention constitute exemplary means for fairly sharing a plurality of GPUs 316 with a plurality of VMs 235. For example, the elements illustrated in FIG. 2, FIG. 3, and/or FIG. 4, such as when encoded to perform the operations illustrated in FIG. 5 and/or FIG. 6, constitute exemplary means for assigning shares to user 108, exemplary means for adjusting the assigned shares based on graphics command characteristics associated with VMs 235, exemplary means for allocating quantum among VMs 235 based on the adjusted, assigned shares, exemplary means for assigning each of VMs 235 to at least one of a plurality of GPUs 316 based on allocated quantum 304 and a composite score associated with each of GPUs 316, transmitting allocated quantum 304 and assigned GPU 420 for each of VMs 235 to GPU driver 307, and exemplary means for scheduling, based on allocated quantum 304 and the assigned GPU 420, graphics operations from VMs 235 for performance on the assigned GPU 420.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. One or more non-transitory computer storage media embodying computer-executable instructions which, when executed, fairly share a plurality of graphics processing units (GPUs) among a plurality of virtual machines (VMs) by:
   assigning shares to a user having one or more VMs associated therewith;
   adjusting the assigned shares based on graphics command characteristics associated with the VMs;
   allocating quantum among the VMs based on the adjusted, assigned shares;
   generating a composite score for each of the plurality of GPUs, each composite score representing normalized processing capabilities of the GPU; and
   assigning each of the VMs to at least one of the plurality of GPUs based on the allocated quantum and the composite scores, wherein each of the plurality of GPUs performs graphics commands from the assigned VMs.

2. The non-transitory computer storage media of claim 1, further comprising normalizing the processing capabilities of each of the plurality of GPUs.

3. The non-transitory computer storage media of claim 1, wherein generating the composite score for each of the plurality of GPUs comprises testing performance of the GPU handling different quantities of VMs.

4. The non-transitory computer storage media of claim 1, wherein generating the composite score for each of the plurality of GPUs comprises adjusting a benchmark score based on application programming interface (API) compatibility.

5. The non-transitory computer storage media of claim 1, wherein the graphics command characteristics indicate a type of graphics commands to be issued by the VMs.

6. The non-transitory computer storage media of claim 1, wherein the graphics command characteristics describe a runtime behavior of the VMs.

7. The non-transitory computer storage media of claim 1, wherein the graphics command characteristics indicate whether the VMs are configured to issue at least one of: two-dimensional graphics commands, three-dimensional graphics commands, surface mapping commands, shading commands, video encoding/decoding, or texture rendering commands.

8. The non-transitory computer storage media of claim 1, wherein assigning the shares comprises assigning the shares based on at least one of: an amount of payment from the user to the cloud service, a service level agreement (SLA) between the user and the cloud service, or a quality of service (QoS) guarantee.

9. The non-transitory computer storage media of claim 1, further comprising transmitting for each of the VMs, the allocated quantum and a GPU identifier associated with the assigned GPU to a GPU driver via an input/output control (IOCTL) command.

10. A method comprising:
assigning shares to a user having one or more VMs associated therewith;
adjusting the assigned shares based on graphics command characteristics associated with the VMs;
allocating quantum among the VMs based on the adjusted, assigned shares;
generating a composite score for each of the plurality of GPUs, each composite score representing normalized processing capabilities of the GPU; and
assigning each of the VMs to at least one of the plurality of GPUs based on the allocated quantum and the composite scores, wherein each of the plurality of GPUs performs graphics commands from the assigned VMs.

11. The method of claim 10, further comprising normalizing the processing capabilities of each of the plurality of GPUs.

12. The method of claim 10, wherein generating the composite score for each of the plurality of GPUs comprises testing performance of the GPU handling different quantities of VMs.

13. The method of claim 10, wherein generating the composite score for each of the plurality of GPUs comprises adjusting a benchmark score based on application programming interface (API) compatibility.

14. The method of claim 10, wherein the graphics command characteristics indicate a type of graphics commands to be issued by the VMs.

15. The method of claim 10, wherein the graphics command characteristics describe a runtime behavior of the VMs.

16. The method of claim 10, wherein the graphics command characteristics indicate whether the VMs are configured to issue at least one of: two-dimensional graphics commands, three-dimensional graphics commands, surface mapping commands, shading commands, video encoding/decoding, or texture rendering commands.

17. The method of claim 10, wherein assigning the shares comprises assigning the shares based on at least one of: an amount of payment from the user to the cloud service, a service level agreement (SLA) between the user and the cloud service, or a quality of service (QoS) guarantee.

18. The method of claim 10, further comprising transmitting for each of the VMs, the allocated quantum and a GPU identifier associated with the assigned GPU to a GPU driver via an input/output control (IOCTL) command.

19. A system for fairly sharing a plurality of graphics processing units (GPUs) among a plurality of virtual machines (VMs), the system comprising:
a plurality of graphics processing units (GPUs) and a plurality of virtual machines (VMs);
a memory area associated with the computing device, said memory area storing graphics commands; and
a processor programmed to:
assign shares to a user having one or more VMs associated therewith;
adjust the assigned shares based on graphics command characteristics associated with the VMs;
allocate quantum among the VMs based on the adjusted, assigned shares;
generate a composite score for each of the plurality of GPUs, each composite score representing normalized processing capabilities of the GPU; and
assign each of the VMs to at least one of the plurality of GPUs based on the allocated quantum and the composite scores, wherein each of the plurality of GPUs performs graphics commands from the assigned VMs.

20. The system of claim 19, wherein the processor is further programmed to transmit for each of the VMs, the allocated quantum and a GPU identifier associated with the assigned GPU to a GPU driver via an input/output control (IOCTL) command.

* * * * *